(12) United States Patent
Yoneda

(10) Patent No.: US 11,437,857 B2
(45) Date of Patent: Sep. 6, 2022

(54) WIRELESS POWER TRANSMISSION APPARATUS AND WIRELESS POWER TRANSMISSION SYSTEM

(71) Applicant: TDK CORPORATION, Tokyo (JP)

(72) Inventor: Kazuki Yoneda, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 17/215,924

(22) Filed: Mar. 29, 2021

(65) Prior Publication Data

US 2021/0305842 A1 Sep. 30, 2021

(30) Foreign Application Priority Data

Mar. 31, 2020 (JP) .............................. JP2020-064505

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .......... H02J 50/12; H02J 50/80; H02M 3/335; H02M 1/0058; H02M 1/32; H02M 3/3372; H02M 3/338
See application file for complete search history.

(56) References Cited

U.S. PATENT DOCUMENTS

| | | | | |
|---|---|---|---|---|
| 2006/0239043 A1* | 10/2006 | Ohbo | ................... | H02M 3/3376 363/25 |
| 2011/0101790 A1* | 5/2011 | Budgett | ................... | H02J 50/80 307/104 |
| 2016/0094053 A1* | 3/2016 | Shimokawa | ............ | H02J 50/12 307/104 |
| 2016/0329638 A1* | 11/2016 | Kanno | ................... | H04B 5/0062 |
| 2020/0134116 A1* | 4/2020 | Chang | .................... | G06F 30/33 |
| 2021/0305843 A1* | 9/2021 | Yoneda | ................... | H02J 50/12 |

FOREIGN PATENT DOCUMENTS

JP 2018-170819 A 11/2018
JP 2018170819 A * 11/2018

* cited by examiner

*Primary Examiner* — Jared Fureman
*Assistant Examiner* — Michael J Warmflash
(74) *Attorney, Agent, or Firm* — Oliff PLC

(57) ABSTRACT

A wireless power transmission apparatus includes a power transmission coil that transmits electric power; a power transmission-side resonant capacitor that is connected to the power transmission coil and that, with the power transmission coil, forms a power transmission-side resonance circuit; and a self-oscillation circuit that converts a DC voltage to an AC voltage, and that supplies the AC voltage to the power transmission coil. The wireless power transmission apparatus has a state, during power transmission, in which multiple resonance points exist in a combined resonance circuit formed by magnetic coupling of the power transmission-side resonance circuit with a power reception-side resonance circuit formed from a power reception coil and a power reception-side resonant capacitor. In the state, the self-oscillation circuit operates at the highest frequency among the multiple resonance points.

6 Claims, 7 Drawing Sheets

WIRELESS POWER TRANSMISSION APPARATUS AND WIRELESS POWER TRANSMISSION SYSTEM

BACKGROUND OF THE INVENTION

Field of the Invention

The present disclosure relates to a wireless power transmission apparatus and a wireless power transmission system.

Priority is claimed on Japanese Patent Application No. 2020-064505, filed Mar. 31, 2020, the content of which is incorporated herein by reference.

Description of Related Art

Conventionally, wireless power transfer technologies for transmitting electric power without using power cables are known. Wireless power transfer technologies are technologies that can be expected to be highly convenient, such as by making both the power-transmitting side and the power-receiving side wireless. Thus, in recent years, the application of these technologies to product fields such as those of compact devices, including cellular telephones, has been advanced. Examples of wireless power transfer systems include electromagnetic induction systems, magnetic field resonance systems, electric field resonance systems, microwave systems, laser systems, ultrasonic systems, and the like.

As a conventional wireless power transmission apparatus, for example, a wireless power transmission system provided with a wireless power transmission apparatus and a wireless power reception apparatus that receives electric power transmitted from the wireless power transmission apparatus has been proposed. In this system, the wireless power transmission apparatus is provided with a self-oscillation circuit, including a power transmission coil for transmitting electric power, that converts a DC voltage applied across a pair of DC input terminals to an AC voltage and that supplies the AC voltage to the power transmission coil, wherein the power transmission coil is composed of a single coil. According to this configuration, a power transmission coil comprising two coils connected by a feedback winding or a center tap does not need to be used. Thus, a wireless power transmission apparatus provided with a high-quality and high-efficiency self-oscillation circuit is considered to be able to be realized at a low cost.

RELATED LITERATURE

Patent Literature

Patent Document 1
  JP 2018-170819 A

SUMMARY OF THE INVENTION

With the self-oscillation circuit in Patent Document 1 mentioned above, if a primary resonance point and a secondary resonance point are brought closer together for the purpose of obtaining high output power and high efficiency, then there will be three frequencies, in other words, resonance points as seen from the input power supply, at which the electric current of a capacitor parallel-connected to the power transmission coil and a reactive current in the power transmission coil cancel each other out. However, if there are three resonance points, since the characteristics will change in accordance with the resonance point that serves as the operating point, there is a risk that unintended characteristics will be obtained depending on the operating point. Thus, the reliability is low and there is still room for improvement.

The technology according to the present disclosure was developed in view of the above-mentioned circumstances, and has the purpose of providing a wireless power transmission apparatus and a wireless power transmission system that can realize high reliability by preventing resonance points with unintended characteristics from becoming operating points.

An embodiment of the present disclosure is a wireless power transmission apparatus provided with a power transmission coil that transmits electric power; a power transmission-side resonant capacitor that, with the power transmission coil, forms a power transmission-side resonance circuit; and a self-oscillation circuit that converts a DC voltage to an AC voltage, and that supplies the AC voltage to the power transmission coil; wherein during power transmission, there is a state in which multiple resonance points exist in a combined resonance circuit formed by magnetic coupling of the power transmission-side resonance circuit with a power reception-side resonance circuit formed from a power reception coil and a power reception-side resonant capacitor; and in the aforementioned state, the self-oscillation circuit operates at the highest frequency among the multiple resonance points.

The technology according to the present disclosure can provide a wireless power transmission apparatus and a wireless power transmission system that can realize high reliability by preventing resonance points with unintended characteristics from becoming operating points.

DETAILED DESCRIPTION OF THE INVENTION

Hereinafter, embodiments of the technology according to the present disclosure will be explained in detail with reference to the drawings.

Figure 1:
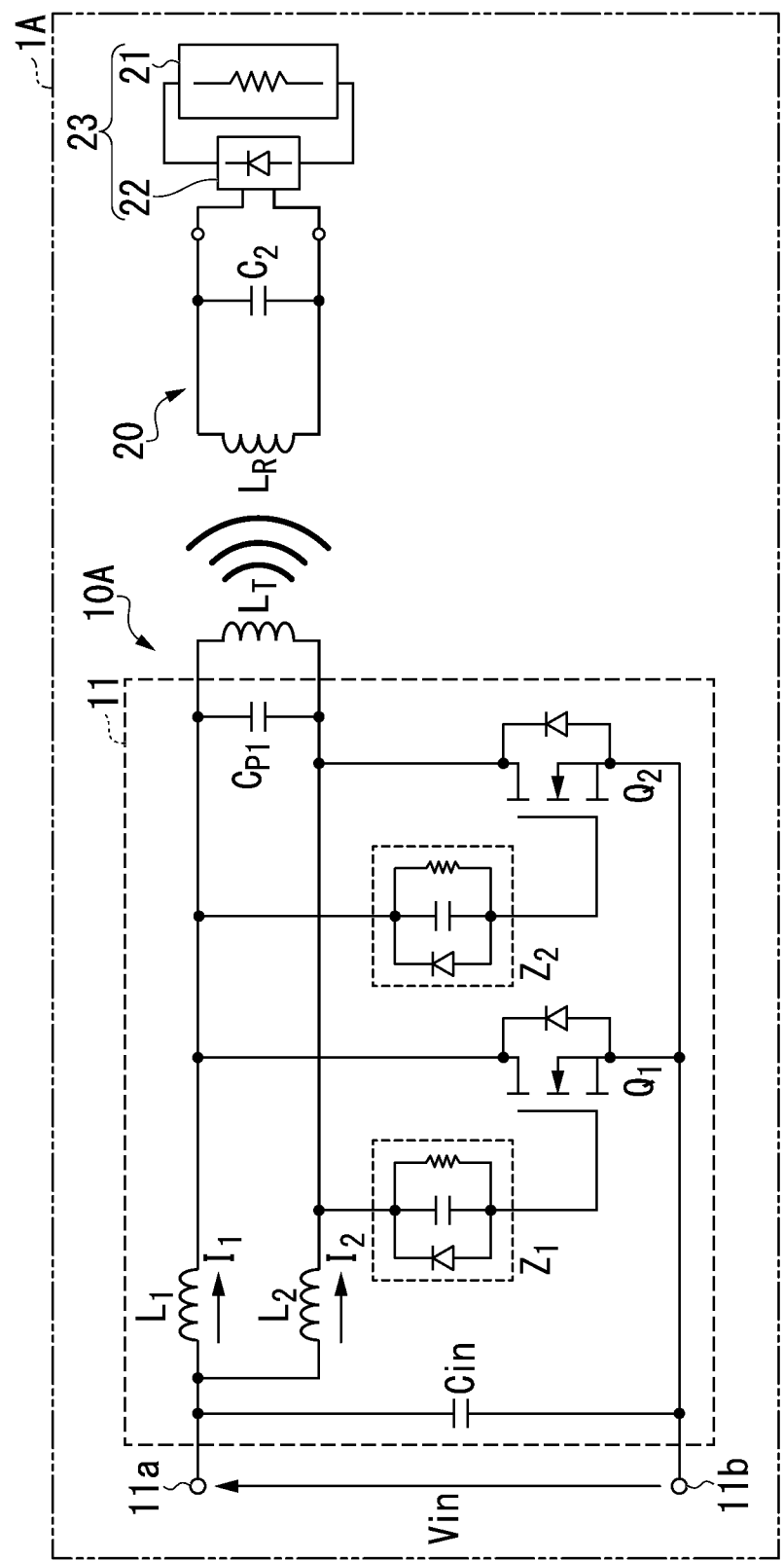
FIG. 1 is a circuit diagram illustrating an example of the structure of a wireless power transmission system according to an embodiment in the present disclosure.

FIG. 1 is a circuit diagram illustrating an example of the structure of a wireless power transmission system according to an embodiment in the present disclosure.

As illustrated in FIG. 1, the wireless power transmission system 1A is provided with a wireless power transmission apparatus 10A and a wireless power reception apparatus 20 that receives electric power transmitted by the wireless power transmission apparatus 10A. This wireless power transmission system 1A wirelessly transmits electric power from the wireless power transmission apparatus 10A to the wireless power reception apparatus 20.

The wireless power transmission apparatus 10A is provided with a power transmission coil $L_T$ that transmits electric power; a power transmission-side resonant capacitor $C_{p1}$ that is parallel-connected to the power transmission coil $L_T$ and that, with the power transmission coil $L_T$, forms a power transmission-side resonance circuit; and a self-oscillation circuit 11 that converts a DC voltage applied across a pair of DC input terminals to an AC voltage, and that supplies the AC voltage to the power transmission coil $L_T$.

The power transmission coil $L_T$ is a coil that functions as an antenna for wireless power transmission. The power transmission coil $L_T$ is formed, for example, by winding a conductive wire comprising litz wire composed of copper, aluminum, or the like. The power transmission coil $L_T$ may be a coil in which a coil pattern is formed, by means of conductive foil composed of copper or the like, on a substrate.

The self-oscillation circuit 11 includes a first inductor $L_1$ connected between one end of the power transmission coil $L_T$ and the positive terminal 11a of the pair of DC input terminals, a second inductor $L_2$ connected between the other end of the power transmission coil $L_T$ and the positive terminal 11a, a first switch element $Q_1$ that is connected to the one end of the power transmission coil $L_T$, a second switch element $Q_2$ that is connected to the other end of the power transmission coil $L_T$, a first impedance element $Z_1$ that is connected between the gate of the first switch element $Q_1$ and the other end of the power transmission coil $L_T$, and a second impedance element $Z_2$ that is connected between the gate of the second switch element $Q_2$ and the one end of the power transmission coil $L_T$.

The power transmission-side resonant capacitor $C_{p1}$ forms the power transmission-side resonance circuit together with the power transmission coil $L_T$, the first inductor $L_1$ and the second inductor $L_2$. In the present embodiment, the power transmission-side resonant capacitor $C_{p1}$ is parallel-connected to the power transmission coil $L_T$, but may be serially connected to the power transmission coil $L_T$. Additionally, two or more power transmission-side resonant capacitors may be serially connected or parallel-connected to the power transmission coil $L_T$.

The first switch element $Q_1$ and the second switch element $Q_2$ are not particularly limited and may, for example, be NMOS transistors. The drain of the first switch element $Q_1$ is connected, via the first inductor $L_1$, to the positive terminal 11a of the pair of DC input terminals, and the drain of the second switch element $Q_2$ is connected, via the second inductor $L_2$, to the positive terminal 11a. Additionally, the source of the first switch element $Q_1$ and the source of the second switch element $Q_2$ are connected to the negative terminal 11b of the pair of DC input terminals. Furthermore, the gate (control electrode) of the first switch element $Q_1$ is connected, via the second inductor $L_2$, to the positive terminal 11a of the pair of DC input terminals, and the gate of the second switch element $Q_2$ is connected, via the first inductor $L_1$, to the positive terminal 11a.

The structures of the first impedance element $Z_1$ and the second impedance element $Z_2$ are not particularly limited, and they may, for example, be formed from a parallel circuit having a diode, a capacitor and a resistor. Thus, the first impedance element $Z_1$ preferably has a resistor or a capacitor, and more preferably, has a diode with a cathode connected to the other end of the power transmission coil $L_T$ and an anode connected to the gate of the first switch element $Q_1$. The second impedance element $Z_2$, like the first impedance element $Z_1$, preferably has a resistor or a capacitor, and more preferably, has a diode with a cathode connected to the one end of the power transmission coil $L_T$ and an anode connected to the gate of the second switch element $Q_2$.

The structure of the wireless power reception apparatus 20 is not particularly limited, and it may, for example, be provided with a power reception coil $L_R$ that magnetically couples with the power transmission coil $L_T$ during power transmission, a power reception-side resonant capacitor $C_2$ that is parallel-connected to the power reception coil $L_R$, and a rectification circuit 22 that converts an AC voltage generated in the power reception coil $L_R$ to a DC voltage. The power reception-side resonant capacitor $C_2$ forms a power reception-side resonance circuit together with the power reception coil $L_R$. In the present embodiment, the power reception-side resonant capacitor $C_2$ is parallel-connected to the power reception coil $L_R$. However, it may be serially connected to the power reception coil $L_R$, or two or more power reception-side resonant capacitors may be serially connected or parallel-connected.

In the present embodiment, the rectification circuit 22 of the wireless power reception apparatus 20 is connected to a load circuit 21. The load circuit 21 may be a battery that is supplied DC voltage from the rectification circuit 22 and that stores electric power, a motor that is driven by being supplied with said DC voltage, or the like. If the load circuit 21 is formed from a battery, then a voltage conversion circuit that converts the DC voltage output from the rectification circuit 22 to a desired DC voltage may be provided between the rectification circuit 22 and the load circuit 21. Hereinafter, the structure including the rectification circuit 22 and the load circuit 21 will be described as a load 23. Additionally, if the abovementioned voltage conversion circuit is provided, then the load 23 will be considered to include the voltage conversion circuit also.

In this wireless power transmission system 1A, first, when a DC voltage is applied across the pair of DC input terminals (the positive terminal 11a and the negative terminal 11b), either the first switch element $Q_1$ is first turned on via the second inductor $L_2$ and the first impedance element $Z_1$, or the second switch element $Q_2$ is first turned on via the first inductor $L_1$ and the second impedance element $Z_2$. Normally, the circuit symmetry is unbalanced due to disparities in the characteristics of the electronic components, causing either the switch element $Q_1$ or the switch element $Q_2$ to be turned on first. In order to ensure asymmetry of the circuit, the impedance of the first impedance element $Z_1$ may be intentionally set to be lower than that of the second impedance element $Z_2$, so that the switch element $Q_1$ is turned on first. Alternatively, the impedance of the second impedance element $Z_2$ may be intentionally set to be lower than that of the first impedance element $Z_1$, so that the switch element $Q_2$ is turned on first.

Furthermore, if, for example, the first switch element $Q_1$ is turned on first, then an electric current $I_1$ flows from the first inductor $L_1$ to the first switch element $Q_1$. Additionally, an electric current $I_2$ flows from the second inductor $L_2$, through the parallel circuit formed by the power transmission coil $L_T$ and the power transmission-side capacitor $C_{p1}$, to the first switch element $Q_1$. Furthermore, when the first switch element $Q_1$ is turned on, the drain-source voltage $V_{ds1}$ of the first switch element $Q_1$ and the gate-source voltage $V_{gs2}$ of the second switch element $Q_2$ become approximately zero, and the second switch element $Q_2$ remains in the off state.

Although the drain-source voltage $V_{ds2}$ of the second switch element $Q_2$ rises due to the electric current $I_2$ flowing, the operation of the power transmission-side resonance circuit including the power transmission coil $L_T$ and the power transmission-side resonant capacitor $C_{p1}$ causes the voltage to fall upon reaching a certain voltage level. When the drain-source voltage $V_{ds2}$ of the second switch element $Q_2$ falls to near zero, the gate-source voltage $V_{gs1}$ of the first switch element $Q_1$ also becomes approximately zero and the first switch element $Q_1$ is turned off.

As described above, both the first switch element $Q_1$ and the second switch element $Q_2$ are turned off. However, the first inductor $L_1$ keeps trying to generate the electric current $I_1$ and the power transmission coil $L_T$ also keeps trying to generate the electric current $I_2$, thus causing the drain-source voltage $V_{ds1}$ of the first switch element $Q_1$ and the gate-source voltage $V_{gs2}$ of the second switch element $Q_2$ to rise, thereby turning the second switch element $Q_2$ on.

Conversely, if the second switch element $Q_2$ is turned on first, then an electric current $I_2$ flows from the second inductor $L_2$ to the second switch element $Q_2$. Additionally, an electric current $I_1$ flows from the first inductor $L_1$, through the parallel circuit formed by the power transmission coil $L_T$ and the power transmission-side capacitor $C_{p1}$, to the second switch element $Q_2$. Furthermore, when the second switch element $Q_2$ is turned on, the drain voltage $V_{ds2}$ of the second switch element $Q_2$ and the gate-source voltage $V_{gs1}$ of the first switch element $Q_1$ become approximately zero, and the first switch element $Q_1$ remains in the off state.

Although the drain-source voltage $V_{ds1}$ of the first switch element $Q_1$ rises due to the electric current $I_1$ flowing, the operation of the power transmission-side resonance circuit including the power transmission coil $L_T$ and the power transmission-side resonant capacitor $C_{p1}$ causes the voltage to fall upon reaching a certain voltage level. When the drain-source voltage $V_{ds1}$ of the first switch element $Q_1$ falls to near zero, the gate-source voltage $V_{gs2}$ of the second switch element $Q_2$ also becomes approximately zero and the second switch element $Q_2$ is turned off.

As described above, both the first switch element $Q_1$ and the second switch element $Q_2$ are turned off. However, the second inductor $L_2$ keeps trying to generate the electric current $I_2$ and the power transmission coil $L_T$ also keeps trying to generate the electric current $I_1$, thus causing the drain-source voltage $V_{ds2}$ of the second switch element $Q_2$ and the gate-source voltage $V_{gs1}$ of the first switch element $Q_1$ to rise, thereby turning the first switch element $Q_1$ on again.

Thus, the first switch element $Q_1$ and the second switch element $Q_2$ enter a steady state while repeating the above-mentioned on/off operations, so that the electric currents $I_1$ and $I_2$ flow in alternating fashion in mutually opposite directions through the power transmission coil $L_T$, thus generating an AC voltage at a prescribed oscillation frequency between the ends of the power transmission coil $L_T$.

The wireless power transmission apparatus 10A formed as described above, during power transmission, has a state M in which there are multiple resonance points in the combined resonance circuit formed by magnetic coupling of the power transmission-side resonance circuit with the power reception-side resonance circuit formed by the power reception coil $L_R$ and the power reception-side capacitor $C_2$. In the present embodiment, the above-mentioned power transmission-side resonance circuit forms a combined resonance circuit by magnetically coupling with the above-mentioned power reception-side resonance circuit. Furthermore, in the state M, the self-oscillation circuit 11 operates with the highest frequency among the multiple resonance points as the operating frequency.

Figure 2:
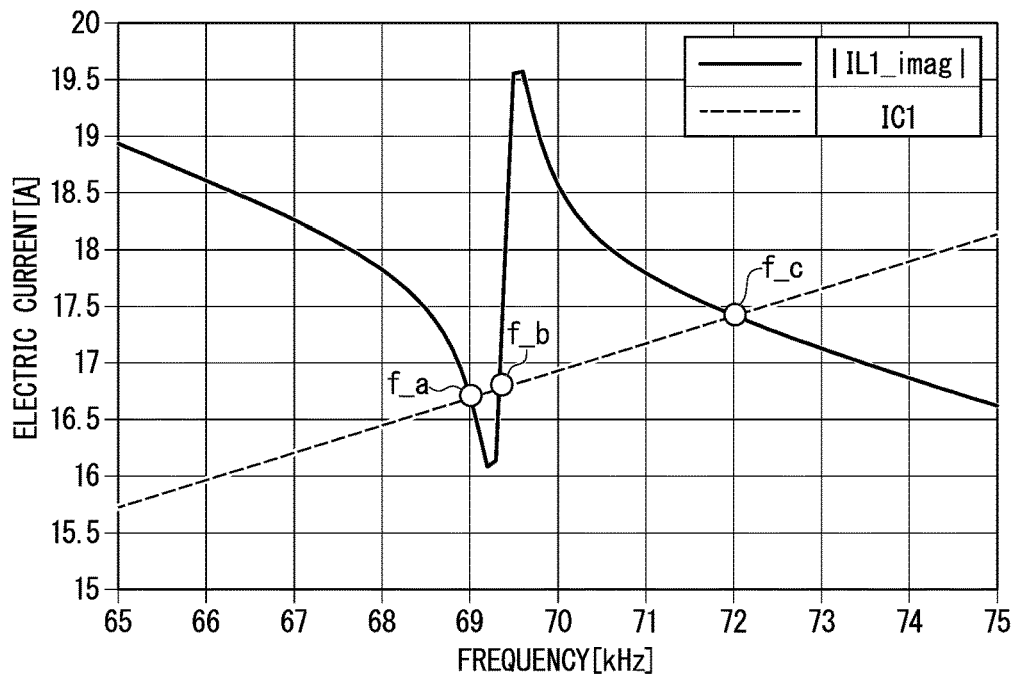
FIG. 2 is a graph indicating, as an example of a state in which there are multiple resonance points in a combined resonance circuit, a state in which there are three resonance points in the combined resonance circuit.

FIG. 2 is a graph indicating, as an example of a state M in which there are multiple resonance points in the combined resonance circuit, a state m in which there are three resonance points in the combined resonance circuit. In FIG. 2, "IC1" denotes the electric current flowing through the power transmission-side resonant capacitor $C_{p1}$, and "|IL1_imag|" denotes the absolute value of the reactive current in the power transmission coil $L_T$.

For example, if adjustments are made to bring a primary resonance point and a secondary resonance point closer together during power transmission, then three resonance points appear as seen from the input power source, as shown in FIG. 2. A "resonance point as seen from the input power source" refers to a frequency at which the reactive current in the power transmission coil $L_T$ cancels out the electric current flowing to the power transmission-side capacitor $C_{p1}$. The three resonance points are composed of a maximum resonance point at the highest frequency, a minimum resonance point at the lowest frequency, and a middle resonance point existing between the maximum resonance point and the minimum resonance point.

At this time, the power transmission-side capacitor $C_{p1}$ is preferably set to a capacitance value such that the difference between the resonance frequency f_c at the maximum resonance point and the resonance frequency f_b at the middle resonance point is greater than the difference between the resonance frequency f_b at the middle resonance point and the resonance frequency f_a at the minimum resonance point. In this case, the self-oscillation circuit 11 operates with the resonance frequency f_c at the maximum resonance point among the three resonance points as the operating frequency. Since a phenomenon occurs such that the resonance point having the greater frequency difference from the resonance frequency f_b at the middle resonance point becomes the operating frequency, operation at the resonance frequency f_c of the maximum resonance point can be ensured by setting the capacitance value of the power transmission-side resonant capacitor $C_{p1}$ so that the difference between the resonance frequency f_c at the maximum resonance point and the resonance frequency f_b at the middle resonance point is greater than the difference between the resonance frequency f_b at the middle resonance point and the resonance frequency f_a at the minimum resonance point.

In this case, the resonance points in the combined resonance circuit according to the present embodiment change in accordance with the state of the load 23. When the load 23 is light, three resonance points appear, and when the load 23 is heavy, one resonance point appears. In other words, when the state of the load 23 changes, the frequency characteristics of the reactive current in the power transmission coil $L_T$ in FIG. 2 change, and the number of resonance points that appear also change. FIG. 2 shows the frequency characteristics of the electric current flowing through the power transmission-side resonant capacitor $C_{p1}$ and the reactive current in the power transmission coil $L_T$ when the load 23 is light. In the present embodiment, the combined resonance circuit has a state in which there are multiple resonance points within the variation range of the load 23. In the case in which the power reception-side resonant capacitor $C_2$ is serially connected to the power reception coil $L_R$, for the resonance points in the combined resonance circuit, one resonance point appears when the load 23 is light, and three resonance points appear when the load 23 is heavy.

In the present embodiment, a state m in which there are three resonance points in the combined resonance circuit in the wireless power transmission apparatus 10A was explained. However, there is no such limitation, and there may be other states in which there are two, or four or more resonance points in the combined resonance circuit. For such cases also, in said states, operation should occur with the highest frequency among the two or four or more resonance points as the operating frequency.

Figure 3:
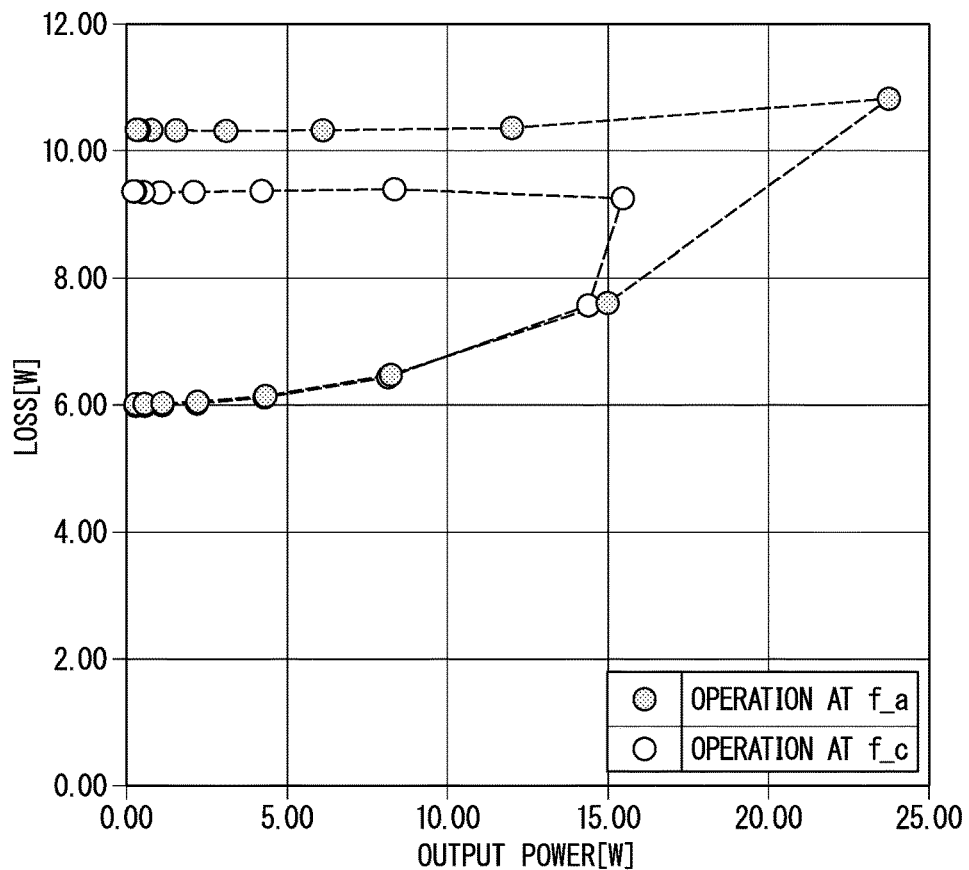
FIG. 3 is a graph indicating the loss in the case in which a wireless power transmission apparatus is operated by changing the resistance value of a load at, respectively, the resonance frequency at the maximum resonance point, which is the highest frequency among the three resonance points, and the resonance frequency at the minimum resonance point, which is the lowest frequency.

FIG. 3 is a graph indicating the loss in the case in which the wireless power transmission apparatus 10A is operated by changing the resistance value of the load 23 at, respectively, the resonance frequency f_c at the maximum resonance point, which is the highest frequency among the three resonance points, and the resonance frequency at the minimum resonance point f_a, which is the lowest frequency. In FIG. 3, the horizontal axis indicates the output power (W) and the vertical axis indicates the loss (W).

In said diagram, in the case of operation at the resonance frequency f_c, which is the maximum resonance point, when trying to obtain, for example, an output electric power of approximately 12 W, there is a loss of approximately 9.3 W. Conversely, in the case of operation at the resonance frequency f_a, which is the minimum resonance point, when trying to obtain, for example, an output electric power of approximately 12 W, there is a loss of approximately 10.3 W. Thus, by operating at the resonance frequency f_c which is the maximum resonance point, low loss can be realized in comparison to the case of operation at the resonance frequency f_a, which is the minimum resonance point.

As mentioned above, according to the present embodiment, in the state M in which there are multiple resonance points in the combined resonance circuit formed by magnetic coupling of the power transmission-side resonance circuit with the power reception-side resonance circuit, the self-oscillation circuit 11 operates with the highest frequency among the multiple resonance points as the operating frequency. Thus, it is possible to prevent a resonance point with unintended characteristics becoming the operating point, allowing high reliability to be realized. Additionally, by using the resonance frequency f_c at the maximum resonance point, low loss can be obtained as a high-level characteristic, and furthermore, the operating frequency becomes relatively high so there is no need to make the inductance large, allowing the apparatus to be made compact.

Additionally, the power transmission-side resonant capacitor $C_{p1}$ is set to a capacitance value such that the difference between the maximum resonance point and the middle resonance point is greater than the difference between the middle resonance point and the minimum resonance point. Thus, operation at the maximum resonance point can be ensured by making use of the phenomenon in which the resonance point at which the difference from the middle resonance point is greater becomes the operating frequency.

Figure 4:
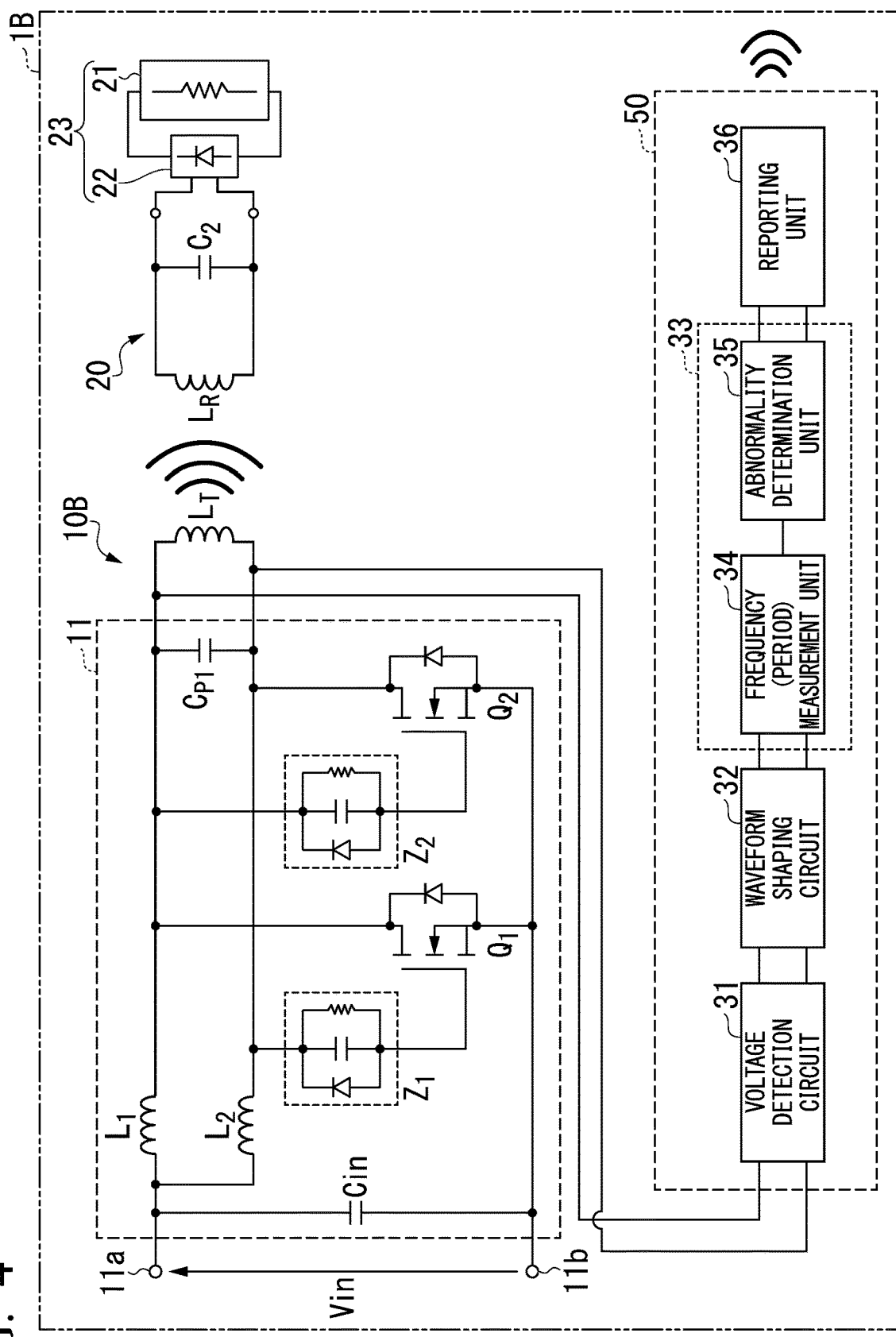
FIG. 4 is a circuit diagram illustrating a modified example of the wireless power transmission system in FIG. 1.

FIG. 4 is a circuit diagram illustrating a modified example of the wireless power transmission system 1A in FIG. 1. The structure of the wireless power transmission system 1B in FIG. 4 is basically the same as the wireless power transmission system 1A in FIG. 1. Structures that are the same are assigned the same reference numbers and the descriptions thereof are omitted. The different portions will be explained below.

As illustrated in said drawing, the wireless power transmission apparatus 10B is further provided with an abnormality reporting circuit 30 that reports abnormalities to a user or to an external destination in accordance with the operating frequency of the self-oscillation circuit 11 in the state M. The abnormality reporting circuit 30 reports an abnormality to a user or to an external destination when the absolute value of the amount of change in the operating frequency is equal to or greater than a prescribed threshold value (abnormality reporting process).

The abnormality reporting circuit 30, for example, has a voltage detection circuit 31 that is parallel-connected to the power transmission coil $L_T$ and that detects a voltage applied to the power transmission coil $L_T$, a waveform shaping circuit 32 that compares a sine-wave voltage signal detected by the voltage detection circuit 31 with a prescribed threshold value and that shapes a square-wave voltage signal, a frequency measurement unit 34 that is provided in a microcomputer 33 and that measures the operating frequency based on the voltage output from the waveform shaping circuit 32, an abnormality determination unit 35 that is provided in the microcomputer 33 and that determines an abnormality based on the operating frequency measurement result, and a reporting unit 36 that reports an abnormality to the user or to an external destination based on the abnormality determination result. The frequency measurement unit 34 may also measure the period based on the voltage output from the waveform shaping circuit 32 and may determine the operating frequency from the measured period.

Figure 5:
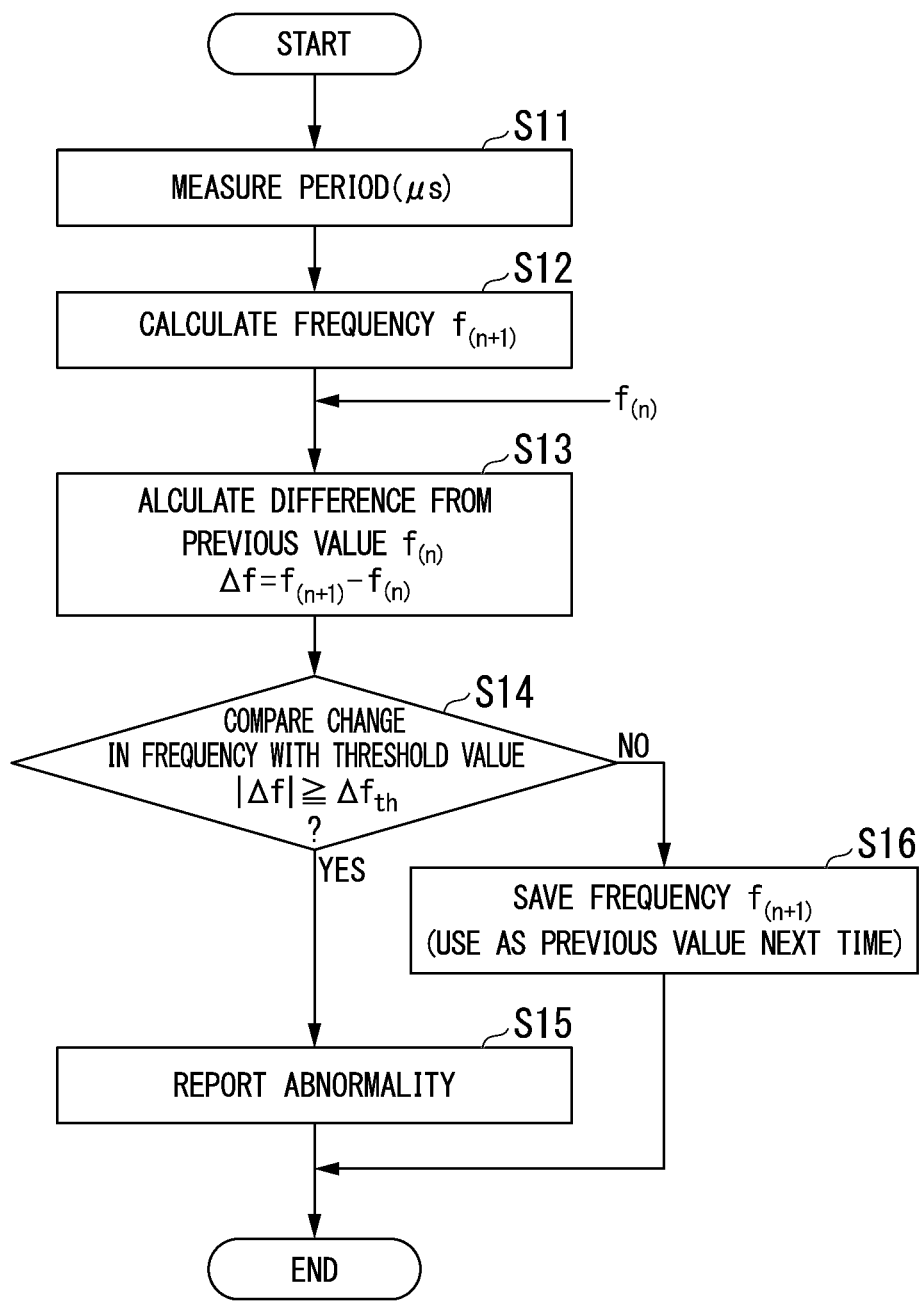
FIG. 5 is a flow chart illustrating an example of an abnormality reporting process performed by the wireless power transmission apparatus in FIG. 4.

FIG. 5 is a flow chart showing an example of an abnormality reporting process performed by the wireless power transmission apparatus 10B in FIG. 4. This abnormality reporting process is not particularly limited, and may, for example, be performed by the microcomputer 33 in the wireless power transmission apparatus 10B.

As shown in FIG. 5, first, the voltage applied to the power transmission coil $L_T$ is detected by using, for example, a voltage-dividing resistor, an amplifier circuit or the like, shaping the detected sine-wave voltage signal into a square-wave voltage signal, and measuring the period (μs) of the detected voltage (step S11). Then, the operating frequency $f_{(n+1)}$ (Hz) is calculated from the measured period (step S12).

Next, using the operating frequency $f_{(n)}$ calculated in the previous abnormality reporting process, the change Δf between the currently calculated operating frequency $f_{(n+1)}$ and the previously calculated operating frequency $f_{(n)}$ is calculated (step S13). Next, the absolute value of the change Δf in the operating frequency is compared with a prescribed threshold value $Δf_{th}$, and it is determined whether or not the absolute value of the change Δf in the operating frequency is equal to or greater than the prescribed threshold value $Δf_{th}$ (step S14). The prescribed threshold value $Δf_{th}$ is not particularly limited, and may, for example, be a value that is at least ten times the absolute value of the change in the operating frequency during normal power transmission. If the absolute value of the change Δf in the operating frequency is equal to or greater than the prescribed threshold value $Δf_{th}$, then it is determined that an abnormality has occurred, and the abnormality is reported, for example, by generating a sound, a color, text, light and/or vibrations (step S15). The resonance frequency f_c, which is the operating frequency, mainly varies in accordance with the load 23 in the wireless power reception apparatus 20. For example, when performing CCCV charging (constant-current, constant-voltage charging), then during a CC charging period, the resonance frequency f_c becomes lower as the load 23 become heavier, and during a CV charging period, the resonance frequency f_c becomes higher as the load 23 becomes lighter. In other words, there is a correlation between the resonance frequency f_c and the load 23 in the cases of both CC charging and CV charging. Thus, if an operating frequency that diverges from said correlation is computed, then the absolute value of the change Δf in the operating frequency will exceed the prescribed threshold value $Δf_{th}$. In this way, it can be determined that an abnormality has occurred in the wireless power reception apparatus 20 (for example, in the load 23). If the absolute value of the change Δf in the operating frequency is less than the prescribed threshold value $f_{th}$ (NO in step S14), then the currently calculated operating frequency $f_{(n+1)}$ is saved and is used as the previous value in the next process (step S16).

According to the present modified example, if the absolute value of the change Δf in the operating frequency is equal to or greater than the prescribed threshold value $Δf_{th}$ (YES in step S14), then the abnormality reporting circuit 30 reports an abnormality to the user or to an external destination (step S15). Thus, abnormalities can be detected without communication between the wireless power transmission apparatus 10B and the wireless power reception apparatus 20 by making use of the fact that the operating frequency varies due to changes in the load 23. Additionally, the occurrence of the abnormalities can be reported to the user or to the external destination by the reporting unit 36, and thus be used to provide malfunction notifications or to determine whether to implement an emergency stoppage.

Figure 6:
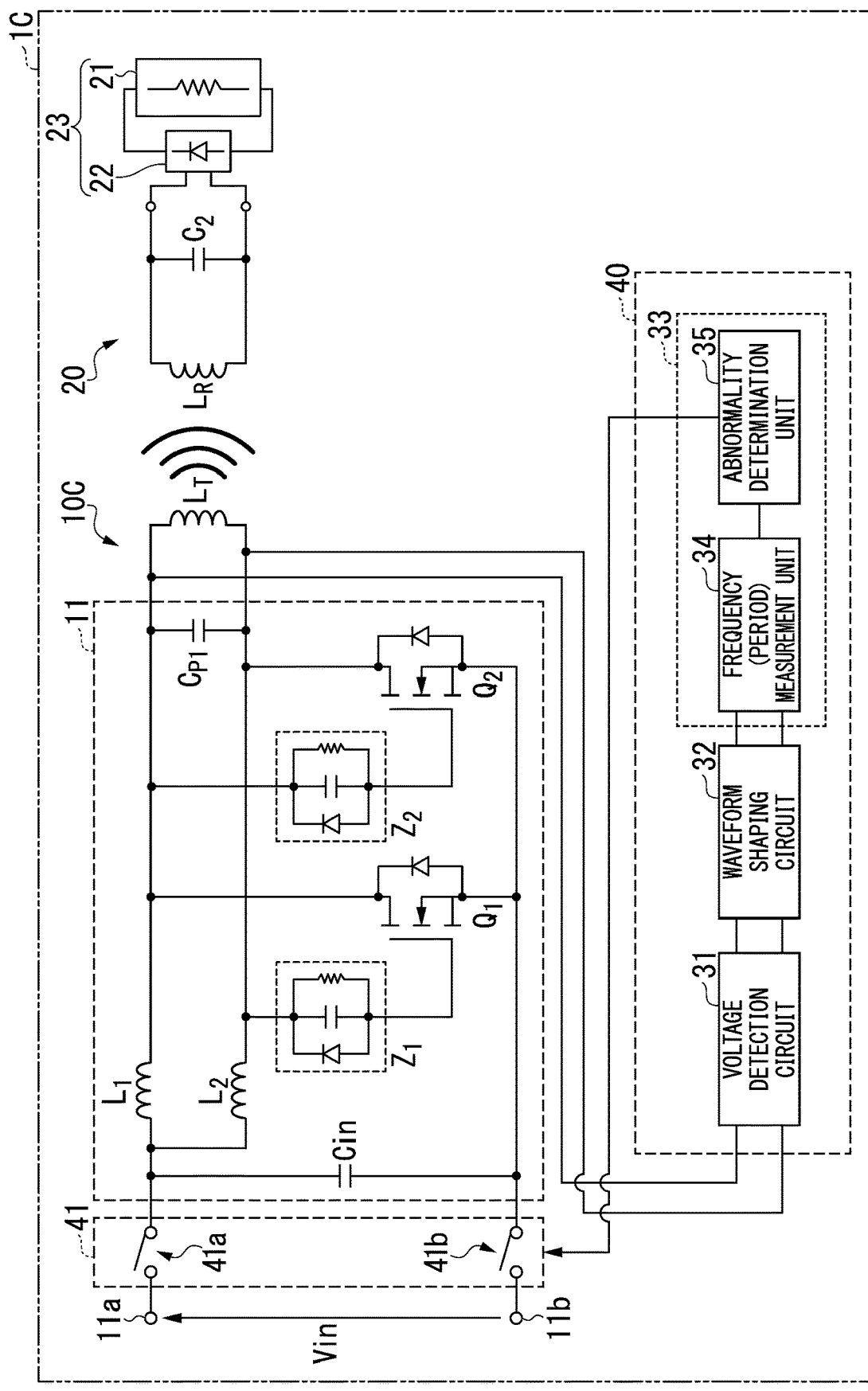
FIG. 6 is a circuit diagram illustrating another modified example of the wireless power transmission system in FIG. 1.

FIG. 6 is a circuit diagram illustrating another modified example of the wireless power transmission system 1A in FIG. 1. The structure of the wireless power transmission system 1C in FIG. 6 is basically the same as the wireless power transmission system 1A in FIG. 1 and the wireless power transmission system 1B in FIG. 4. Structures that are the same are assigned the same reference numbers and the descriptions thereof are omitted. The different portions will be explained below.

As illustrated in said drawing, the wireless power transmission apparatus 10C is further provided with a switch 41 that is serially connected to at least one of the pair of DC input terminals, and a control circuit 40 that controls opening/closing operations of the switch 41 in accordance with the operating frequency of the self-oscillation circuit 11 in the state M. In the present embodiment, the switch 41 is formed from a first switch 41a connected to the positive terminal 11a of the pair of DC input terminals, and a second switch 41b connected to the negative terminal 11b of the pair of DC input terminals. The opening/closing operations are performed based on signals transmitted from the abnormality determination unit 35. The control circuit 40 has, for example, a voltage detection circuit 31, a waveform shaping circuit 32, and a frequency measurement unit 34 and an abnormality determination unit 35 provided in a microcomputer 33. This control circuit 40 puts the switch 41 in the open state if the absolute value of the change in the operating frequency becomes equal to or greater than the prescribed threshold value (control process). The first switch 41a and the second switch 41b are formed from a mechanical switch such as a relay, or a semiconductor switch.

Figure 7:
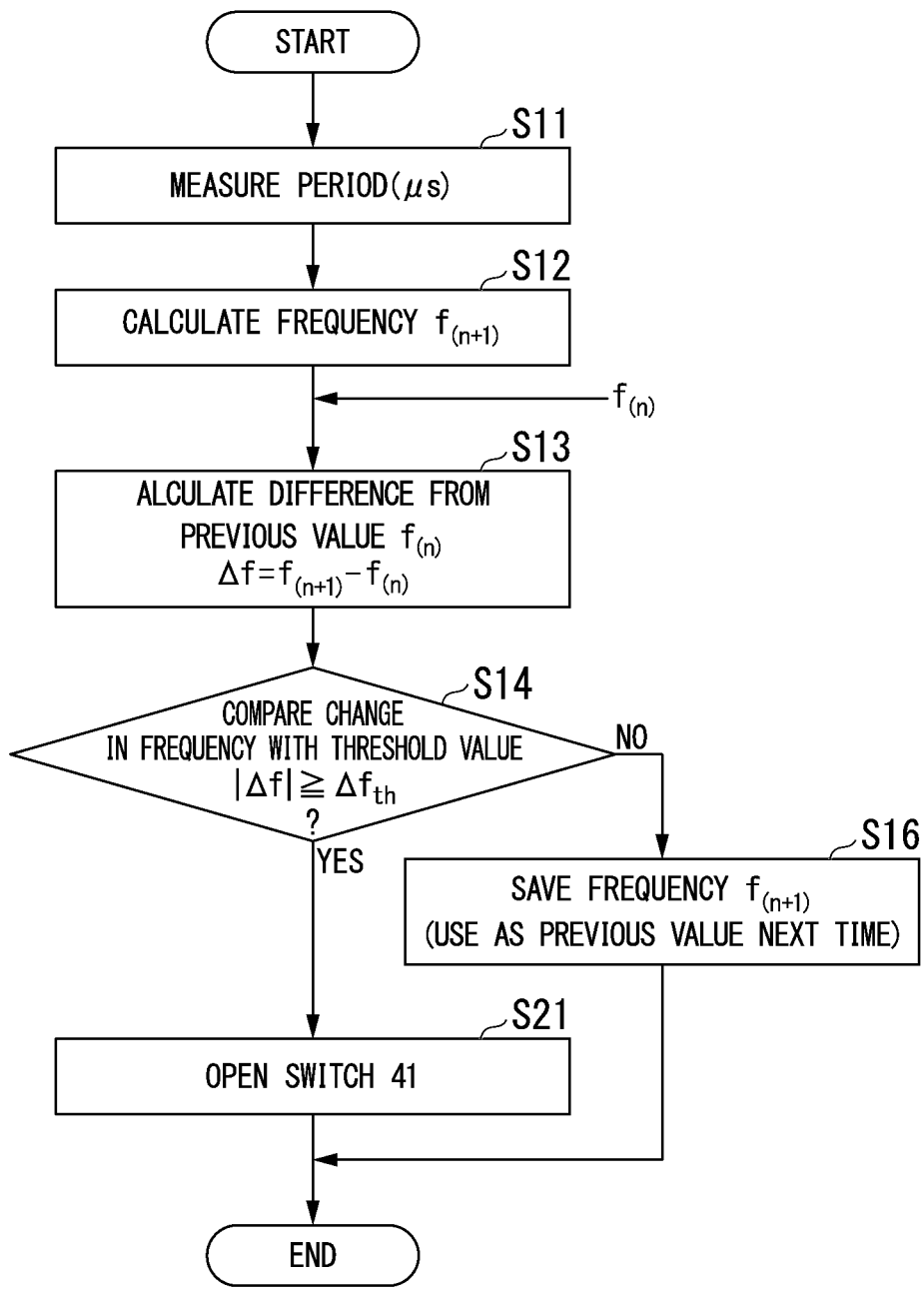
FIG. 7 is a flow chart illustrating an example of a control process performed by the wireless power transmission apparatus in FIG. 6.

FIG. 7 is a flow chart showing an example of a control process performed by the wireless power transmission apparatus 10C in FIG. 6. This control process is not particularly limited, and may, for example, be performed by the microcomputer 33 in the wireless power transmission apparatus 10C.

In FIG. 7, the processes in steps S11 to step S14 and step S16 are the same as the processes in steps S11 to step S14 and step S16 in the abnormality reporting process in FIG. 5. In step S14, if the absolute value of the change Δf in the resonance frequency f_c, which is the operating frequency, becomes equal to or greater than the prescribed threshold value $Δf_{th}$, then it is determined that an abnormality has occurred, and both the first switch 41a and the second switch 41b are put in the open state (step S21). In the present embodiment, when it is determined that an abnormality has occurred, both the first switch 41a and the second switch 41b are put in the open state. However, there is no such limitation, and just one of the first switch 41a and the second switch 41b may be put in the open state. Additionally, in the present embodiment, the switch 41 is formed from the first switch 41a and the second switch 41b. However, it may be formed from just the first switch 41a or just the second switch 41b.

According to the present modified example, if the absolute value of the change Δf in the operating frequency is equal to or greater than the prescribed threshold value $Δf_{th}$ (YES in step S14), then the control circuit 40 switches the switch 41 from the closed state to the open state (step S21). Thus, by controlling the opening and the closing of the switch 41 serially connected to the pair of DC input terminals, protective measures such as emergency disconnection can be implemented on the basis of the occurrence of an abnormality determined in step S14.

Figure 8:
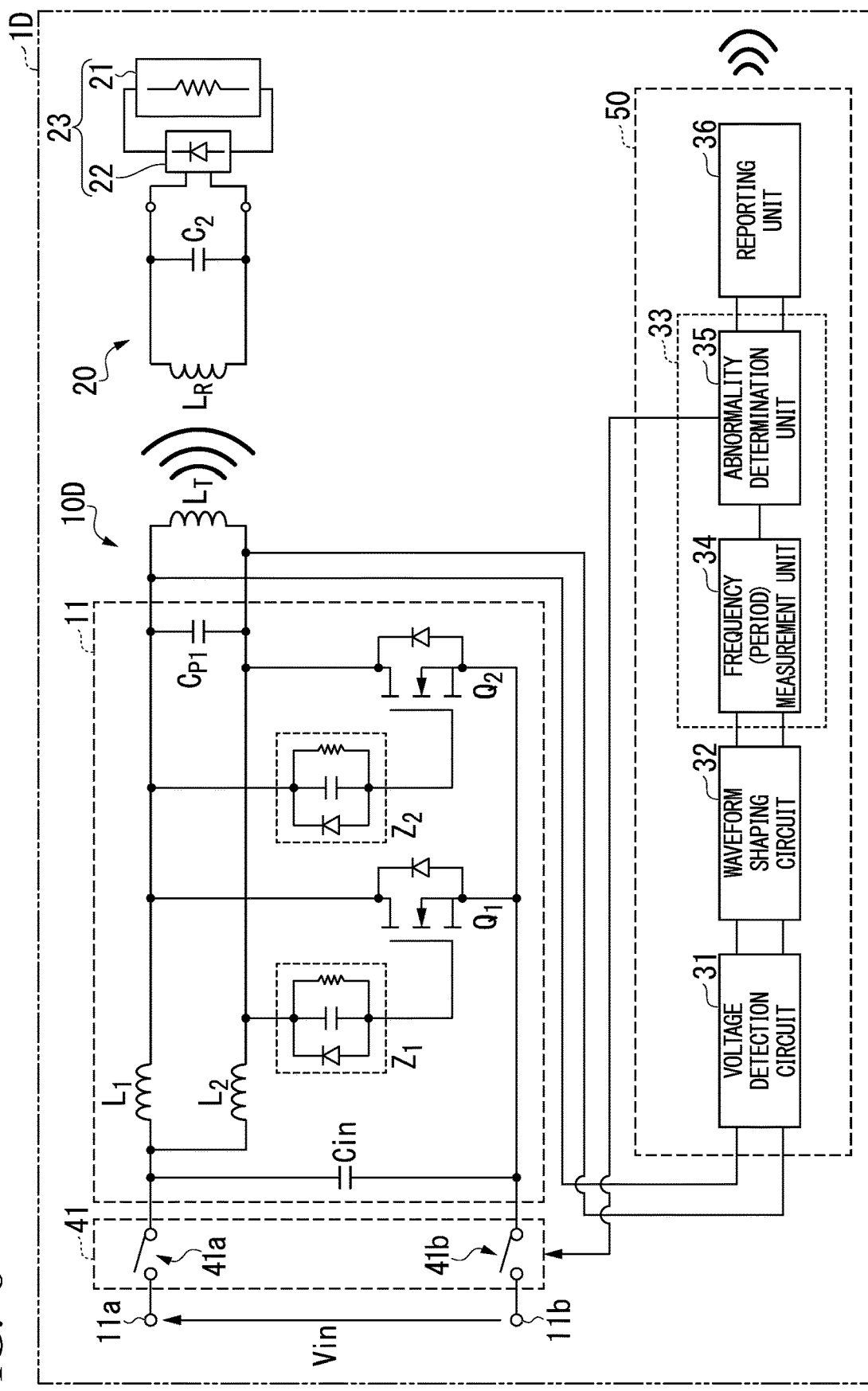
FIG. 8 is a circuit diagram illustrating another modified example of the wireless power transmission system in FIG. 1.

FIG. 8 is a circuit diagram illustrating another modified example of the wireless power transmission system 1A in FIG. 1. The structure of the wireless power transmission system 1D in FIG. 8 is basically the same as the wireless power transmission system 1A in FIG. 1, the wireless power transmission system 1B in FIG. 4, and the wireless power transmission system 1C in FIG. 6. Structures that are the same are assigned the same reference numbers and the descriptions thereof are omitted. The different portions will be explained below.

As illustrated in said drawing, the wireless power transmission apparatus 10D is further provided with a switch 41 that is serially connected to at least one of the pair of DC input terminals, and a control circuit 50 that reports abnormalities to a user or to an external destination and that controls opening/closing operations of the switch 41 in accordance with the operating frequency of the self-oscillation circuit 11 in the state M. This control circuit 50 reports abnormalities to the user or to the external destination if the absolute value of the change in the operating frequency is equal to or greater than a prescribed threshold value (abnormality reporting process), and if the absolute value of the change in the operating frequency is equal to or greater than the prescribed threshold value, puts the switch 41 in the open state (control process). For example, if the absolute value of the change in the resonance frequency f_c, which is the operating frequency, is equal to or greater than the prescribed threshold value $Δf_{th}$, then it is determined that an abnormality has occurred and the abnormality is reported, for example, by generating a sound, a color, text, light and/or vibrations, and furthermore, one or both of the first switch 41a and the second switch 41b in the self-oscillation circuit 11 are put in the open state.

According to the present modified example, the occurrence of an abnormality can be reported to the user or to an external destination by the reporting unit 36 and can thus be used to provide a malfunction notification or to determine whether to implement an emergency stoppage, and protective measures such as emergency disconnection can be implemented on the basis of the occurrence of the abnormality, thereby allowing wireless power transmission to be realized while sufficiently ensuring protective functions.

Structural Examples

As one structural example, the wireless power transmission apparatus is provided with a power transmission coil that transmits electric power; a power transmission-side resonant capacitor that, with the power transmission coil, forms a power transmission-side resonance circuit; and a self-oscillation circuit that converts a DC voltage to an AC voltage, and that supplies the AC voltage to the power transmission coil. During power transmission, there is a state in which multiple resonance points exist in a combined resonance circuit formed by magnetic coupling of the power transmission-side resonance circuit with a power reception-side resonance circuit formed by a power reception coil and a power reception-side resonant capacitor. In the aforementioned state, the self-oscillation circuit operates at the highest frequency among the multiple resonance points.

As one structural example, in the wireless power transmission apparatus, the multiple resonance points may be three resonance points.

As one structural example, in the wireless power transmission apparatus, the three resonance points may be a maximum resonance point at the highest frequency, a minimum resonance point at the lowest frequency, and a middle resonance point between the maximum resonance point and the minimum resonance point; and the power transmission-side capacitor may be set to a capacitance value at which the difference between the maximum resonance point and the middle resonance point is greater than the difference between the middle resonance point and the minimum resonance point.

As one structural example, the wireless power transmission apparatus may be further provided with an abnormality reporting circuit that reports an abnormality to a user or to an external destination; wherein the abnormality reporting circuit reports an abnormality to the user or to the external destination if the absolute value of a change in the operating frequency of the self-oscillation circuit is equal to or greater than a prescribed threshold value.

As one structural example, the wireless power transmission apparatus may be further provided with a switch that is serially connected to at least one of a pair of DC input terminals of the self-oscillation circuit to which the DC voltage is applied; and a control circuit that controls opening/closing operations of the switch; wherein the control circuit opens the switch if the absolute value of a change in an operating frequency of the self-oscillation circuit is equal to or greater than a prescribed threshold value.

As one structural example, the wireless power transmission system may be provided with a wireless power transmission apparatus; and a wireless power reception apparatus that receives electric power transmitted by the wireless power transmission apparatus; wherein the wireless power transmission apparatus is the wireless power transmission apparatus as described above; and the wireless power reception apparatus comprises the power reception coil, which magnetically couples with the power transmission coil during power transmission, the power reception-side resonant capacitor, which is connected to the power reception coil, and a rectification circuit that converts an AC voltage generated in the power reception coil to a DC voltage.

A program for implementing the functions of any of the constituent units in any of the apparatuses such as the wireless power transmission apparatus or the wireless power reception apparatus described above may be recorded in a computer-readable recording medium, and the program may be read into a computer system and executed. In this case, a "computer system" includes an operating system (OS) or hardware such as a peripheral device. Additionally, a "computer-readable recording medium" refers to a portable medium such as a flexible disk, a magneto-optic disc, a ROM, a CD (Compact Disc)-ROM or the like, or a storage apparatus such as a hard disk inside a computer system. Furthermore, the "computer-readable recording medium" includes media that hold the program for a certain period of time, such as volatile memory in a computer system that serves as a server or a client when the program is transmitted via a network such as the internet or a communication line such as a telephone line. Said volatile memory may, for example, be RAM. The recording medium may, for example, be a non-temporary recording medium.

Additionally, the above-mentioned program may be transmitted from a computer system that stores this program in a storage apparatus or the like to another computer system through a transmission medium or by means of transmission waves in a transmission medium. In this case, the "transmission medium" that transmits the program refers to a medium having the function of transmitting information, including a network such as the internet or a communication line such as a telephone line.

Additionally, the abovementioned program may be for realizing a portion of the aforementioned functions. Furthermore, the abovementioned program may be a so-called difference file that can realize the aforementioned functions by being combined with a program that is already recorded in a computer system. The difference file may be referred to as a difference program.

Additionally, the functions of any of the constituent units in any of the apparatuses such as the wireless power transmission apparatus or the wireless power reception apparatus described above may be realized by means of a processor. For example, the processes in the present embodiment may be realized by a processor operating on the basis of information such as a program, and a computer-readable recording medium storing information such as a program. In this case, for example, the processor may be realized by individual hardware performing the functions of each unit, or may be realized by a single hardware unit that performs the functions of all of the units. For example, the processor may include hardware, and said hardware may include at least one of a circuit for processing digital signals and a circuit for processing analog signals. For example, the processor may be formed by using one or a plurality of circuit devices and/or one or a plurality of circuit elements mounted on a circuit board. ICs (Integrated Circuits) or the like may be used as the circuit devices, and resistors, capacitors or the like may be used as the circuit elements.

In this case, the processor may, for example, be a CPU (Central Processing Unit). However, the processor is not limited to being a CPU, and various types of processors may be used, such as, for example, a GPU (Graphics Processing Unit) or a DSP (Digital Signal Processor). Additionally, the processor may, for example, be a hardware circuit such as an ASIC (Application Specific Integrated Circuit). Additionally, the processor may, for example, be formed form a plurality of CPUs, or may be formed from a hardware circuit by means of a plurality of ASICs. Additionally, the processor may, for example, be formed from a combination of a plurality of CPUs and a plurality of hardware circuits such as ASICs. Additionally, the processor may, for example, be one or more amplifier circuits, filter circuits or the like for processing analog signals.

While preferred embodiments of the technology according to the present disclosure have been described in detail above, the present disclosure is not limited to these specific embodiments, and various modifications are possible within the scope of the present disclosure as recited in the claims.

DESCRIPTION OF REFERENCE SIGNS

1A Wireless power transmission system
1B Wireless power transmission system
1C Wireless power transmission system
1D Wireless power transmission system
10A Wireless power transmission apparatus
10B Wireless power transmission apparatus
10C Wireless power transmission apparatus
10D Wireless power transmission apparatus
11 Self-oscillation circuit
11a Positive terminal
11b Negative terminal
20 Wireless power reception apparatus
21 Load circuit
22 Rectification circuit
23 Load
30 Abnormality reporting circuit
31 Voltage detection circuit
32 Waveform shaping circuit
33 Microcomputer
34 Frequency measurement unit
35 Abnormality determination unit
36 Reporting unit
40 Control unit
41 Switch
41a First switch
41b Second switch
50 Control circuit

What is claimed is:

1. A wireless power transmission apparatus comprising:
a power transmission coil that transmits electric power;
a power transmission-side resonant capacitor that, with the power transmission coil, forms a power transmission-side resonance circuit; and
a self-oscillation circuit that converts a DC voltage to an AC voltage, and that supplies the AC voltage to the power transmission coil;
wherein
during power transmission, there is a state in which multiple resonance points exist in a combined resonance circuit formed by magnetic coupling of the power transmission-side resonance circuit with a power reception-side resonance circuit formed from a power reception coil and a power reception-side resonant capacitor;
in the aforementioned state, the self-oscillation circuit operates at the highest frequency among the multiple resonance points; and
the multiple resonance points are defined as frequencies when an electric current in the power transmission coil and an electric current flowing through the power transmission-side resonant capacitor cancel out each other.

2. The wireless power transmission apparatus as in claim 1, wherein the multiple resonance points are three resonance points.

3. The wireless power transmission apparatus as in claim 2, wherein:
the three resonance points are a maximum resonance point at the highest frequency, a minimum resonance point at the lowest frequency, and a middle resonance point between the maximum resonance point and the minimum resonance point; and
the power transmission-side capacitor is set to a capacitance value at which the difference between the maximum resonance point and the middle resonance point is greater than the difference between the middle resonance point and the minimum resonance point.

4. The wireless power transmission apparatus as in claim 1, further comprising:
an abnormality reporting circuit that reports an abnormality to a user or to an external destination;
wherein the abnormality reporting circuit reports an abnormality to the user or to the external destination if the absolute value of a change in an operating frequency of the self-oscillation circuit is equal to or greater than a prescribed threshold value.

5. The wireless power transmission apparatus as in claim 1, further comprising:
a switch that is serially connected to at least one of a pair of DC input terminals of the self-oscillation circuit to which the DC voltage is applied; and
a control circuit that controls opening/closing operations of the switch;
wherein the control circuit opens the switch if the absolute value of a change in an operating frequency of the self-oscillation circuit is equal to or greater than a prescribed threshold value.

6. A wireless power transmission system comprising:
a wireless power transmission apparatus; and
a wireless power reception apparatus that receives electric power transmitted by the wireless power transmission apparatus;
wherein
the wireless power transmission apparatus is the wireless power transmission apparatus as in claim 1, and
the wireless power reception apparatus comprises
the power reception coil, which magnetically couples with the power transmission coil during power transmission,
the power reception-side resonant capacitor, which is connected to the power reception coil, and
a rectification circuit that converts an AC voltage generated in the power reception coil to a DC voltage.

* * * * *